United States Patent [19]

Reifschneider et al.

[11] Patent Number: 4,737,178

[45] Date of Patent: Apr. 12, 1988

[54] METHOD FOR MANUFACTURING MINERAL FIBERS

[75] Inventors: Louis G. Reifschneider, Columbus; Michael J. Rolf, Reynoldsburg, both of Ohio

[73] Assignee: Owens-Corning Fiberglas Corporation, Toledo, Ohio

[21] Appl. No.: 926,923

[22] Filed: Oct. 27, 1986

[51] Int. Cl.$^4$ .................................... C03B 37/04
[52] U.S. Cl. .............................. 65/2; 65/6; 65/8; 73/861.01
[58] Field of Search ............ 65/1, 2, 29, 162, 6, 65/8; 73/861.01, 861.02, 3

[56] References Cited

U.S. PATENT DOCUMENTS

| | | | |
|---|---|---|---|
| 3,573,017 | 3/1971 | Griem, Jr. | 65/2 |
| 3,600,149 | 8/1971 | Chen et al. | 65/162 |
| 3,838,999 | 10/1974 | Groves | 65/29 |
| 4,028,083 | 6/1977 | Patznick et al. | 65/29 |
| 4,090,241 | 5/1978 | Houston | 65/326 X |
| 4,203,155 | 5/1980 | Garst | 65/2 X |
| 4,277,274 | 7/1981 | Chrisman | 65/29 |
| 4,297,893 | 11/1981 | Weinstein | 73/861 |
| 4,392,879 | 7/1983 | Takeuchi et al. | 65/6 |
| 4,405,351 | 9/1983 | Sheinkop | 65/29 |

FOREIGN PATENT DOCUMENTS

WO/8202094  6/1982  PCT Int'l Appl. .
2091418  1/1982  United Kingdom .

Primary Examiner—Robert L. Lindsay
Attorney, Agent, or Firm—Ted C. Gillespie

[57] ABSTRACT

A method for manufacturing mineral fibers comprises controlling the bushing temperature to maintain molten glass throughput from a bushing at a constant, calculating the viscosity of the molten glass from the bushing temperature and the temperature of a glass delivery means, and modifying a process parameter in response to the calculated viscosity.

6 Claims, 2 Drawing Sheets

METHOD FOR MANUFACTURING MINERAL FIBERS

TECHNICAL FIELD

This invention pertains to manufacturing mineral fibers from molten mineral material. More particularly, this invention pertains to controlling the flow of molten glass supplied to a fiberizer, and controlling process parameters of the fiber manufacturing process.

BACKGROUND OF THE INVENTION

It is a common practice to manufacture mineral fibers, such as glass fibers, by supplying molten mineral material from a furnace or melter to fiberizers. The fiberizers typically comprise spinners for centrifuging the molten mineral material into mineral fibers. The fiber production is sometimes facilitated by the use of annular burners or internal burners which keep the spinner at proper operating temperatures. Also, annular blowers can be positioned downstream from the spinner to assist in attenuation of the fibers to the desired diameter.

One of the problems which has long plagued the manufacturers of mineral fibers is variation in the amount of glass flowing into the spinner, or "throughput". Variations in throughput create different forces on the glass fiber forming process, resulting in poor product quality because of changes in diameter of the fibers being produced. The problem of measuring throughput has been solved and, now that throughput can be measured, the throughput can be controlled at a constant by throttling the flow of molten material entering the fiberizer. Typically, the flow of molten material is throttled by changing the temperature of the bushing which emits the molten material from the forehearth to the spinner.

There is another problem, however, which still has a great effect on the manufacturing process. Even though the throughput can be maintained at a constant, variations in the viscosity of the molten mineral material can greatly affect the mineral fiber forming process. These variations in viscosity can occur because of temperature changes in the molten mineral material being supplied to the spinner, or can result from changes in the chemical composition of the molten mineral material itself. Typically, the viscosity of the molten material in a production furnace is measured by a slow, off-line process, and this measurement is usually made no more than once daily. There is a need for a viscosity measuring process which can be used on-line and done automatically, and which will not disturb the mineral fiber manufacturing process.

STATEMENT OF THE INVENTION

A method for controlling a mineral fiber manufacturing process has now been developed whereby the throughput of the molten mineral material is maintained at a constant and the viscosity of the molten mineral material is calculated, and one or more process parameters are modified in response to the calculated viscosity.

According to this invention there is provided a method for manufacturing mineral fibers comprising feeding molten mineral material from a delivery means to a bushing, discharging the molten mineral material from the bushing to a fiberizer for manufacturing mineral fibers, controlling the bushing temperature $T_1$ to maintain the molten mineral material throughput from the bushing at a constant, measuring the temperature $T_1$ of the bushing and the temperature $T_2$ of the delivery means, calculating the viscosity of the molten mineral material from $T_1$ and $T_2$, and modifying a process parameter in response to the calculated viscosity.

In a specific embodiment of the invention, the delivery means is a forehearth, and the process parameter modification is a modification of the heat input into the forehearth.

In another specific embodiment of the invention, the fiberizer comprises a spinner surrounded by an annular blower, and the blower pressure is modified in response to the calculated viscosity.

In another embodiment of the invention, the fiberizer comprises a burner, and the heat output from the burner is modified in response to the calculated viscosity.

In yet another embodiment of the invention, the chemical composition of the mineral material is modified in response to the calculated viscosity.

In another embodiment of the invention, the fiberizer comprises a spinner in which the rotational speed of the spinner is modified in response to the calculated viscosity.

DESCRIPTION OF THE INVENTION

This invention will be described in terms of a glass fiber forming and attenuating process, although it is to be understood that the process is suitable for fibers of other mineral materials, particularly of such materials as rock, slag and basalt.

Figure 1:
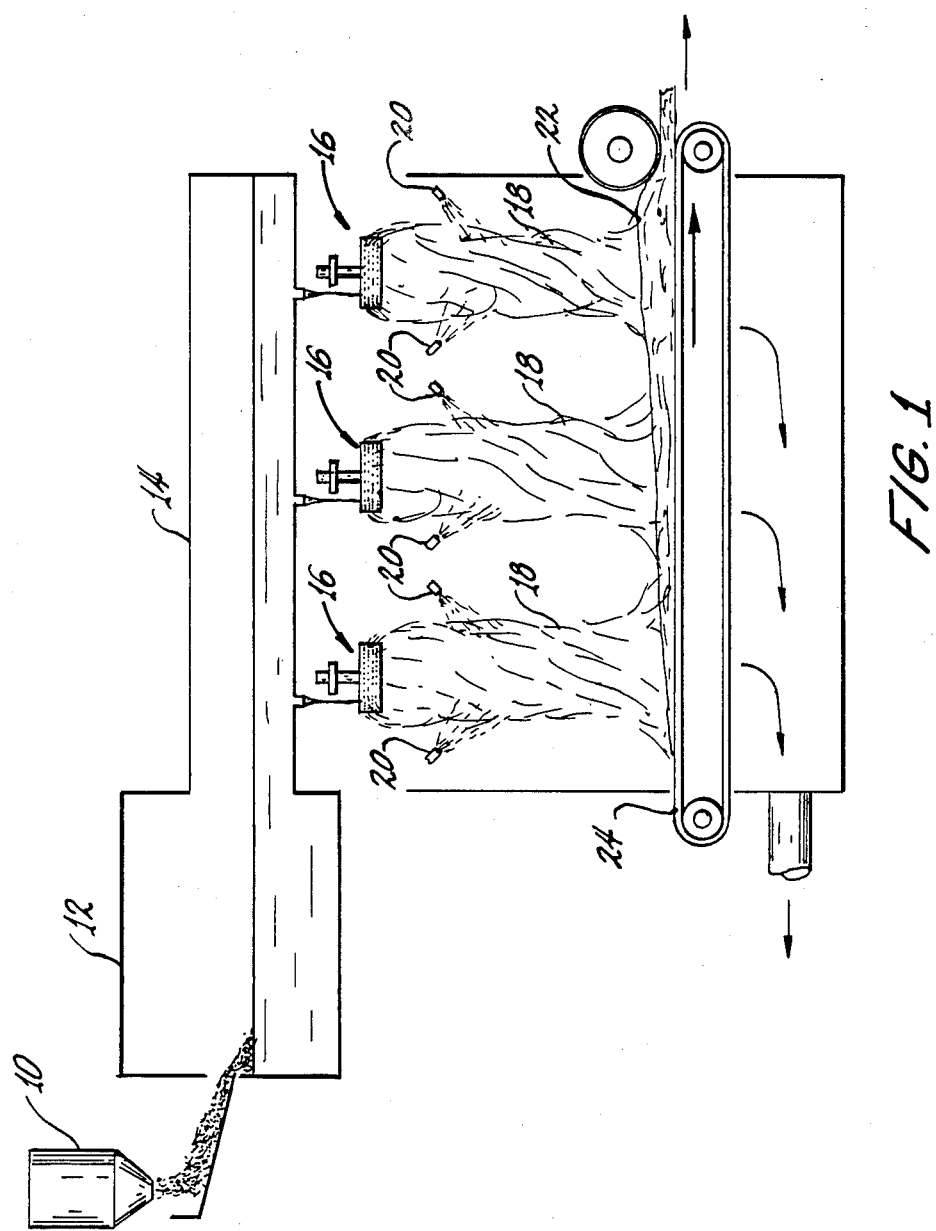
FIG. 1 is a schematic view in elevation of apparatus for manufacturing mineral fibers.

As shown in FIG. 1, glass batch is supplied from batch supply 10 into furnace or melter 12. After the glass is melted it flows through a molten glass delivery means, such as forehearth 14, to the equipment for producing glass fibers, such as fiberizer 16. The fiberizer can be any device suitable for making mineral fibers. A rotary fiberizer produces a downwardly moving veil 18 of glass fibers which are sprayed with binder 20. The fibers are collected as pack 22 on collection conveyor 24.

Figure 2:
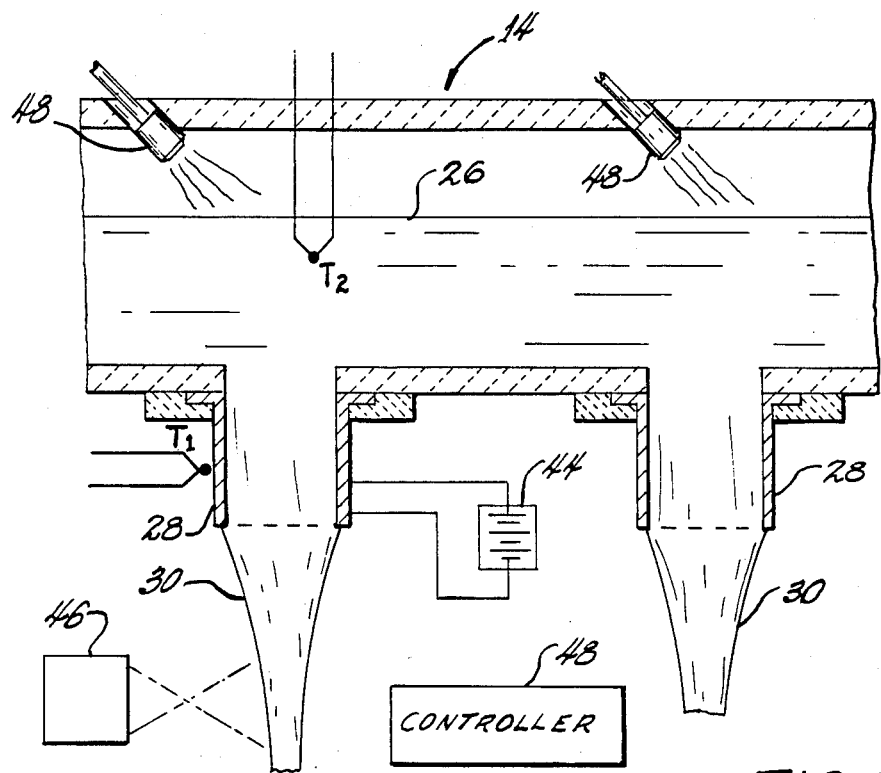
FIG. 2 is a schematic sectional view in elevation illustrating in greater detail the bushing for discharging molten glass from the forehearth.
Figure 3:
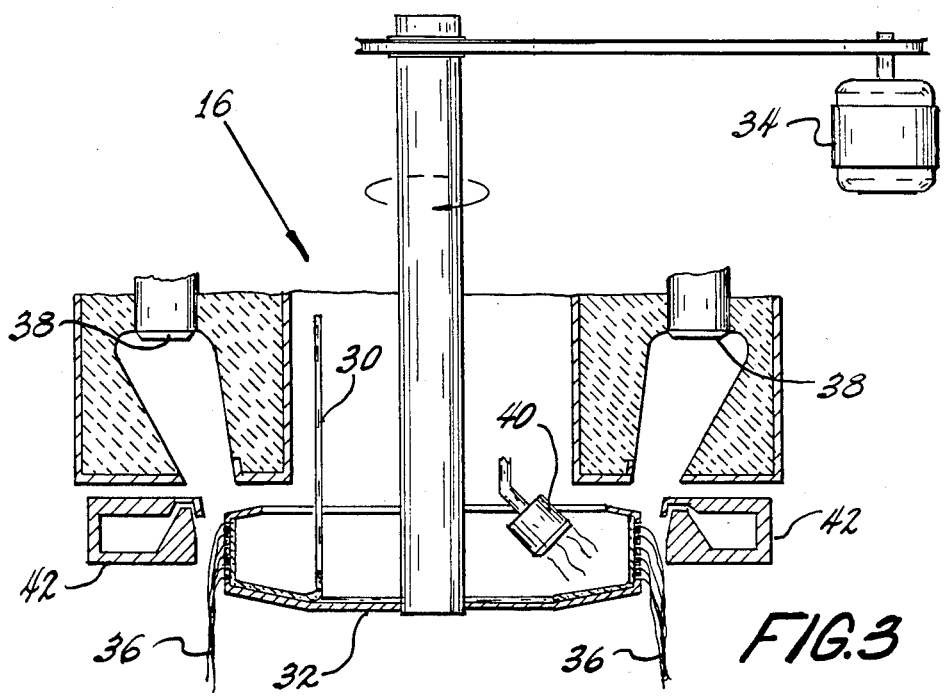
FIG. 3 is a schematic sectional view in elevation of a fiberizer for manufacturing mineral fibers.

As shown in FIGS. 2 and 3, molten glass 26 flows along the forehearth and is withdrawn through bushings 28. The molten glass drops from the bushing as molten glass stream 30 into rotating spinner 32. The spinner is rotated by any suitable means such as pulley and motor 34, as is well known in the art.

Molten glass within the spinner is forced to flow through orifices in the spinner wall by centrifugal force to form glass fibers 36. The spinner and fibers can be maintained at proper operating temperatures, if so desired, by annular burner 38, an internal burner such as internal burner 40, or any other suitable means. Any suitable means for facilitating further attenuation, such as blower 42, also can be used, as is known in the art.

The bushings are heated by electrical resistance heating and supplied with a voltage from any suitable power source, such as power supply 44. Increases in the voltage raise the temperature of the bushing, thereby allowing more molten glass to flow through the bushing and increasing the volume flow or throughput of the molten glass stream.

The throughput can be measured by any suitable device, such as flow throughput equipment 46 sold by Gullfiber AB, Billesholm, Sweden, and described in PCT International patent publication No. WO 81/02466, incorporated herein by reference. Another throughput measurement device is described in U.S. Pat. No. 4,297,893, to Weinstein. Preferably, the throughput measuring device will not interrupt the flow of molten glass emanating from the bushing. The throughput equipment is operatively connected to a controller, such as controller 48 which may be a microprocessor. Also connected to the controller is the power supply 44 for controlling the temperature of the bushing. The controller can be programmed to sense the throughput and control it at a constant by modifying the power input to the bushing.

Once the throughput is maintained at a constant by modification of the bushing temperature $T_1$, the changes in bushing temperature $T_1$ provide an indication of changes in viscosity. One additional factor affects changes in bushing temperature $T_1$, and that is changes in the temperature $T_2$ of the glass delivery system or forehearth. Temperatures $T_1$ and $T_2$ can be measured by any suitable means, such as thermocouples. Using the bushing temperature $T_1$ and the forehearth temperature $T_2$, the viscosity can be calculated empirically using a general formula. In one example of actual practice, empirical data resulted in the use of the following formula:

$$\text{viscosity (log 2.5)} = 1656 + 0.1325 T_1 + 0.112 T_2.$$

This equation has resulted in agreement within about 3° F. of the running viscosity of the glass melting furnace as measured by the daily samples. It is to be understood that the aforementioned equation is not the only formula which could be used in actual practice. Further, the use of the equation assumes some of the process parameters such as the glass level in the forehearth and the bushing geometry and its physical properties are held constant. Finally, if any of the assumed constant parameters are changed, then the equation must be recalibrated for the new operating conditions.

The controller can be programmed to calculate the viscosity and can be provided with continuous readings of $T_1$ and $T_2$ from the appropriate thermocouples. Once the viscosity is calculated, any number of process parameters can be modified in response to the viscosity calculation. The viscosity can be compared with a set point viscosity and acted upon accordingly.

One means of modifying the process in response to changes in the viscosity is to modify the heat input into the forehearth. The forehearth can be adapted with forehearth burners 48, as shown in FIG. 2, for maintaining the molten mineral material at the proper process temperature. In the event the viscosity is measured as being too high, the controller can provide a signal to the gas supplied to the forehearth burners which will increase the heat input into the forehearth. Likewise, in the event the viscosity is too low, the heat input into the furnace can be throttled back.

In processes where the spinner is surrounded by an annular blower for assisting in attenuation of the fibers, the blower pressure can be modified in response to the calculated viscosity. Therefore, in the event that the viscosity is too low, increased blower pressure might be needed in order to attenuate properly the more fluid fibers being formed.

Another process parameter which can be modified in response to the calculated viscosity is either, or both, of the two burners, the internal burner or the external burner. This can be programmed to be done automatically, or can be done manually. The change in the gas pressure flowing to the burners affects the temperature of the spinner, and consequentially the temperature of the molten glass as it leaves the spinner. Calculated viscosities lower than the set point would indicate a need to lower the heat supply to the spinner by the burners.

In another embodiment of the invention, the batch supply can be altered in response to the calculated change in viscosity. This modification would have a longer term effect, and would take longer to take effect, possibly as long as 24 hours or longer. This is in contrast to the changes in the fiberizer process parameters, which would have a nearly instantaneous effect.

Another process parameter which could be modified is the rotational speed. The controller could be linked to the motor to control the rotational speed, providing a greater rotational speed to increase the centrifugal force on more viscous glass.

It will be evident from the foregoing that various modifications can be made to this invention. Such, however, are considered as being within the scope of the invention.

INDUSTRIAL APPLICABILITY

This invention will be found to be useful in the production of glass fibers for thermal and acoustical insulation.

We claim:

1. The method for manufacturing mineral fibers comprising feeding molten mineral material from a delivery means to a bushing, discharging the molten mineral material from the bushing to a fiberizer for manufacturing mineral fibers, controlling the bushing temperature $T_1$ to maintain the molten material throughput from the bushing at a constant, measuring the temperature $T_1$ of the bushing and temperature $T_2$ of the delivery means, calculating the viscosity of the molten material from $T_1$ and $T_2$, and modifying a process parameter in response to the calculated viscosity.

2. The method of claim 1 in which the delivery means is a forehearth, and in which the process parameter modification is a modification of the heat input into the forehearth.

3. The method of claim 1 in which the fiberizer comprises a spinner surrounded by an annular blower, and in which the blower pressure is modified in response to the calculated viscosity.

4. The method of claim 1 in which the fiberizer comprises a burner, and in which the heat output from the burner is modified in response to the calculated viscosity.

5. The method of claim 1 in which the chemical composition of the mineral material is modified in response to the calculated viscosity.

6. The method of claim 1 in which the fiberizer comprises a spinner and in which the rotational speed of the spinner is modified in response to the calculated viscosity.

* * * * *